United States Patent
Bratten

(10) Patent No.: US 6,508,944 B1
(45) Date of Patent: Jan. 21, 2003

(54) VACUUM FLUSH ASSIST SYSTEM AND PROCESS FOR HANDLING MACHINING CUTTING FLUID

(76) Inventor: Jack R. Bratten, 4657 Twin Fawn La., Orchard Lake, MI (US) 48324

(*) Notice: Subject to any disclaimer, the term of this patent is extended or adjusted under 35 U.S.C. 154(b) by 0 days.

(21) Appl. No.: 09/928,649

(22) Filed: Aug. 14, 2001

(51) Int. Cl.$^7$ ............................................. B01D 17/12
(52) U.S. Cl. .................. 210/805; 210/167; 210/171; 210/168; 137/589; 137/606; 409/131; 409/137
(58) Field of Search .................. 210/167, 168, 210/171, 767, 805, 416.1, 416.5; 137/395, 544, 583, 589, 602, 606; 409/131, 136, 137

(56) References Cited

U.S. PATENT DOCUMENTS

| | | | | |
|---|---|---|---|---|
| 2,595,559 A | * | 5/1952 | Alvord | 210/167 |
| 3,518,917 A | * | 7/1970 | Sluham | 409/131 |
| 4,325,663 A | * | 4/1982 | Lee | 210/168 |
| 4,655,940 A | * | 4/1987 | Harms | 210/167 |
| 5,223,156 A | * | 6/1993 | Maier | 210/805 |
| 5,230,793 A | * | 7/1993 | Lenhart et al. | 210/171 |
| 5,380,446 A | * | 1/1995 | Bratten | 210/805 |
| 5,417,849 A | * | 5/1995 | McEwen | 210/168 |
| 5,466,380 A | * | 11/1995 | Bratten | 210/805 |
| 5,662,812 A | * | 9/1997 | McEwen | 210/171 |
| 5,800,104 A | * | 9/1998 | Miyano | 210/168 |
| 5,980,735 A | * | 11/1999 | Bratten | 210/167 |

* cited by examiner

Primary Examiner—Christopher Upton
(74) Attorney, Agent, or Firm—John R. Benefiel

(57) ABSTRACT

A vacuum assist system and process for handling cutting fluid and chips collected from a series of machine tools includes a closed header pipe extending below a series of sumps associated with the machine tools, the sumps draining into the header pipe. The header pipe has a down leg extending vertically down to a filter tank which is opened periodically to drain the header pipe, developing a vacuum which assists the flow of liquid down the header pipe so as to insure a sufficient flow velocity in the header pipe to carry the collected chips out of the header pipe and into the filter tank with the cutting fluid.

10 Claims, 3 Drawing Sheets

VACUUM FLUSH ASSIST SYSTEM AND PROCESS FOR HANDLING MACHINING CUTTING FLUID

BACKGROUND OF THE INVENTION

This invention concerns the handling of cutting fluid used in the machining of metal parts to enable the cutting fluid to be filtered and reused.

In a typical installation, the cutting fluid containing chips and other debris is deposited in a trench extending below the machine tools. The flow of cutting fluid is designed to carry the chips, and other debris down the trench to a pit where filtration apparatus cleans the cutting fluid for reuse.

In order to insure that the chips are carried down the trench, a certain flow velocity is necessary, i.e., 7 ft/sec. is a typical minimum flow velocity with iron or steel chips. This requires a fairly steep slope such that the trench becomes quite deep if a long run is involved. Floor trenches are quite costly to construct, particularly if a double lining is required by environmental regulations, as hidden leaks are a problem as they may exist for long periods, allowing the oil containing cutting fluids to pollute the ground water. In addition, concrete lined trenches below grade make plant revisions more costly and difficult since such trenches cannot be relocated.

Flushing jets are sometimes required to be used in the trenches to assist in sweeping the chips and other solid debris down the trench, but such jets are effective only for short distances, require powerful pumps and interrupt the trench bottom contour. Augmenting flushing flows have also been used, in which additional flows are pumped into the trench such as described in U.S. Pat. No. 4,655,940, again requiring pumps and reducing the capacity of the filter apparatus by diverting filtered liquid from reuse.

Above grade cutting fluid collection systems have also been devised, such as described in U.S. Pat. Nos. 5,466,380; 4,325,663; and 5,223,156. These systems rely on pumps to transfer the fluids above grade, and such pumps are costly and subject to failure. Reliability suffers since the system will not function if there is a pump failure, sometimes requiring that a back up pump be provided, further increasing the system cost.

It is the object of the present invention to provide a handling system for cutting fluid and solid debris which eliminates the need for steeply sloping trenches to establish sufficient flow velocity to insure that chips are cleared from the trench.

It is a further object of the invention to provide a collection system which can be installed above or at grade but which does not rely on pumps or flushing jets in a collection trench.

SUMMARY OF THE INVENTION

The above recited objects and other objects which will be understood upon a reading of the following specification and claims are achieved by establishing a vacuum assisted flushing of a closed header pipe extending beneath a series of individual sumps, each receiving cutting fluid and chips from a machine tool installation, the fluid flowing by gravity into each sump.

Each sump has a gravity flow connection to the collection pipe.

The drain header pipe has a down leg which extends to a below grade filter tank, the drawing of the downward leg develops a siphon vacuum when a main control valve at the bottom of the leg is opened to initiate flushing of the collection pipe. The height of the down leg is selected to develop a sufficient vacuum to at least achieve the minimum flow velocity in the header pipe to insure movement of all of the solid debris with the flow of cutting fluid.

The cutting fluid from each sump enters the drain header pipe, with a series of air vents allowing the header pipe to be filled with fluid and chips draining from the sumps with the main control valve closed.

Upon filling of the collection pipe, all of the air vents are closed except for a primary air vent at the upstream end. The fluid and chips quickly drain out of the pipe under the vacuum developed by opening of the header pipe down leg valve, developing a flow velocity in the pipe header sufficient to insure that the chips are carried down the length of the header pipe with the cutting fluid into the filtration apparatus.

The height of the down leg is selected to develop a vacuum level able to overcome the head losses due to friction with the full length of the collection pipe and still develop the minimum flow velocity in the collection pipe.

The sumps can continue to drain into the header pipe during a fluid cycle, but any sump drain may be closed off when the fluid level in that sump declines below a certain minimum level to prevent any air from entering the header pipe during the flush cycle to maintain the vacuum acting on the fluid in the header pipe during a flush cycle.

The header pipe may have a stepped diameter, increasing in a downstream direction such that higher flow velocities can be developed at the upstream end with a smaller flush volume, although a constant diameter header pipe can also be used.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
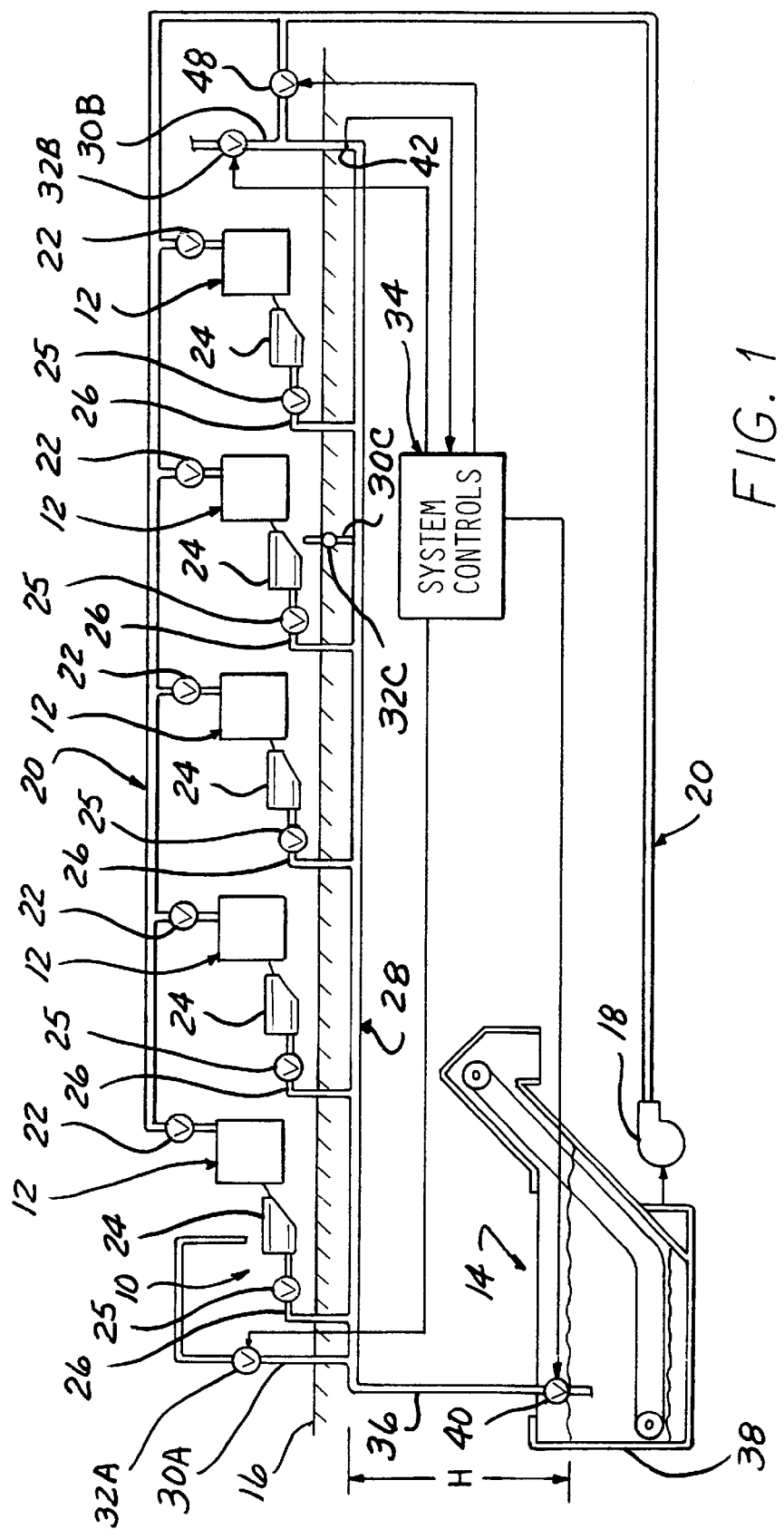
FIG. 1 is a diagram of a vacuum flush assist machining fluid collection according to the present invention.

Referring to FIG. 1, a vacuum assist flush collector system 10 is shown associated with a series of machine tools 12, depicted in block diagram form.

Filtration apparatus 14 is of a well known type disposed in a pit located below floor grade indicated by line 16. The filtration apparatus 14 includes an open tank 38 receiving cutting fluid from the machine tools 12 collected by the handling system 10, filters the same and a pump 18 returns clean fluid via piping 20 to the machine tools 12 for reuse. The supply of clean cutting fluid to each machine tool 12 may be controlled by valves 22 in respective branches of the piping 20.

The machine tools 12 each has an individual sump 24 disposed to receive the drainage of cutting fluid and chips from each machine tool 12.

Each sump 24 in turned has an outlet 26 connected to a closed main collection pipe 28, here shown as a constant diameter and extending horizontally below floor grade beneath the sumps 24. Liquid drains by gravity from the sumps 24, through control valves 25 and drain outlet 26 and into the header pipe 28, which is sized to receive the volumes of fluid generated, i.e., on the order of 12"–24".

The header pipe 28 has one or more intermediate vent pipes 30A, 30C connected thereto with a primary vent 30B at the upstream end, each able to be opened or closed by valves 32A, 32B, 32C under the control of the system controls 34.

A down leg 36 of a length "L" is connected to the downstream end of the header pipe 28, directing flow into the open tank 38 of the filter apparatus 14, with a flush control valve 40 controlling outflow of liquid from the bottom end of the down leg 36.

The vertical height of the down leg 36 is selected to be enough to generate sufficient vacuum when the flush control valve 40 is opened to overcome pipe friction and achieve a high enough flow velocity to insure that the chips are entrained with the cutting fluid. A typical down leg height would be about 6 feet for a 400 foot, 24 inch pipe.

The flush control valve 40 is opened periodically after the header pipe becomes full, as sensed when a sensor 22 senses a rising the level in the primary vent pipe 30B.

The downstream vent 30A is closed to prevent air from being drawn into the header pipe 28 during a flush with the upstream vent 30B remaining open.

The liquid in down leg 36 descends into the tank 38 creating a siphon vacuum acting on the liquid in the header 28, drawing the same down the length thereof, with air entering open valve 30B. The flow velocities would increase progressively as the pipe empties due to reducing pipe friction and liquid mass. It has been calculated that an initial flow velocity of 8.8 ft/sec. In a 400 foot pipe would be attained increasing to 9.9 ft/sec. When only 300 feet of the pipe is full, 12.8 ft/sec., when a 200 feet is full, and 15 ft/sec., when only a 100 feet is full, all of the these being above the minimum of 7 ft/sec. flow velocity desired.

Figure 2:
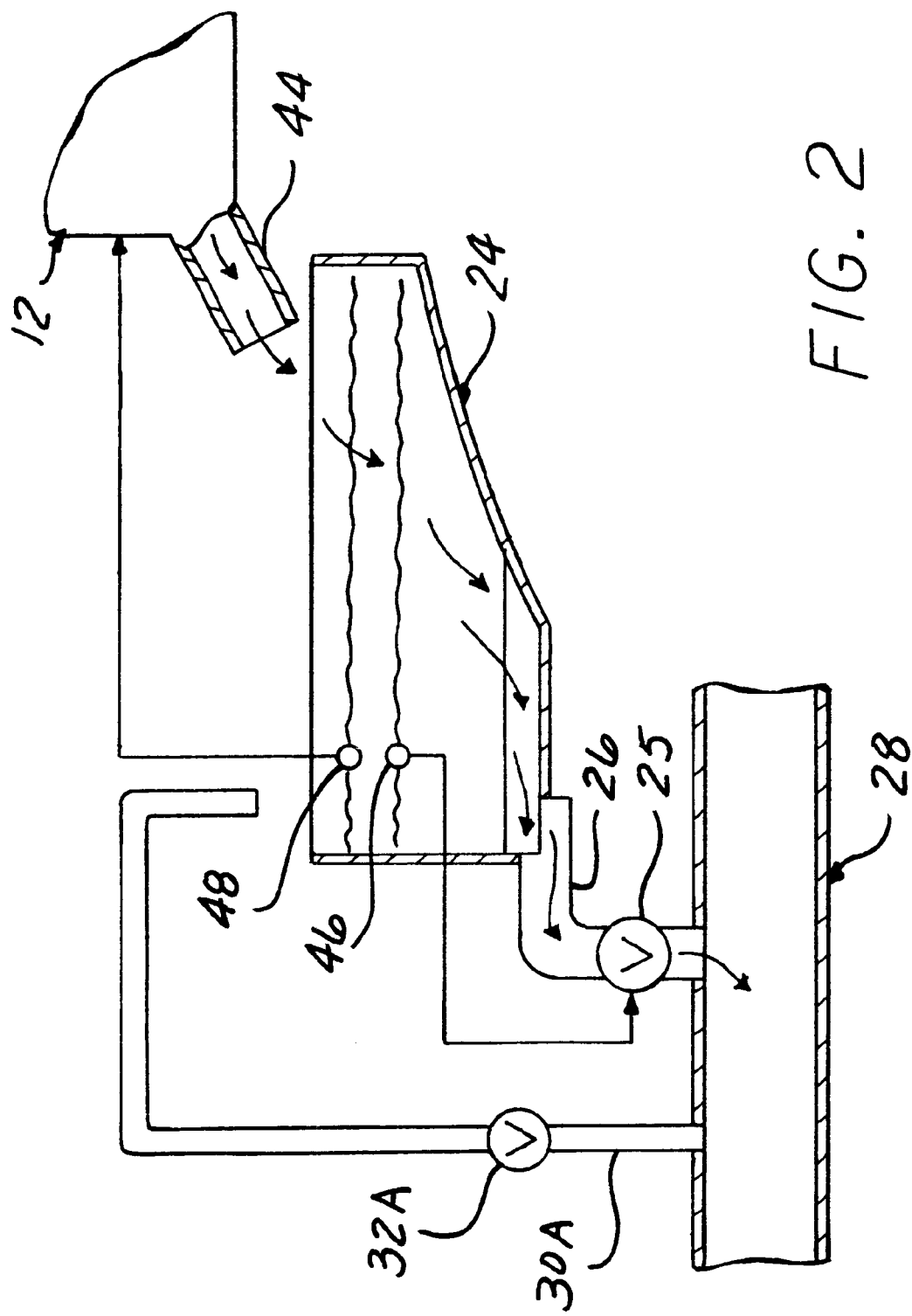
FIG. 2 is a diagram of a representative sump incorporated in the systems shown in FIGS. 1 and 2.

Further details of the sump 24 are shown in FIG. 2, which receives fluid from the machine 12 via a drain pipe 44, and gravity flow into the header pipe 28 via drain 26. A first level sensor 46 generates a signal closing the valve 25 when the liquid level declines below a predetermined minimum to prevent air from entering the header pipe 28. The vent pipe 30A is preferably down turned over the sump 24 to catch any minor liquid splashes exiting out of the vent 30A.

An emergency overflow sensor 48 can also be provided shutting off flow of coolant to the machine tools 12 (which also may be shut down as necessary). The drainage to the header pipe 28 can continue during a flush cycle as long as the liquid remains above the 16 minimum level.

A valve 48 can also be provided to selectively direct a flow of clean filtered liquid down the header pipe 28 to clean out the same periodically.

Figure 3:
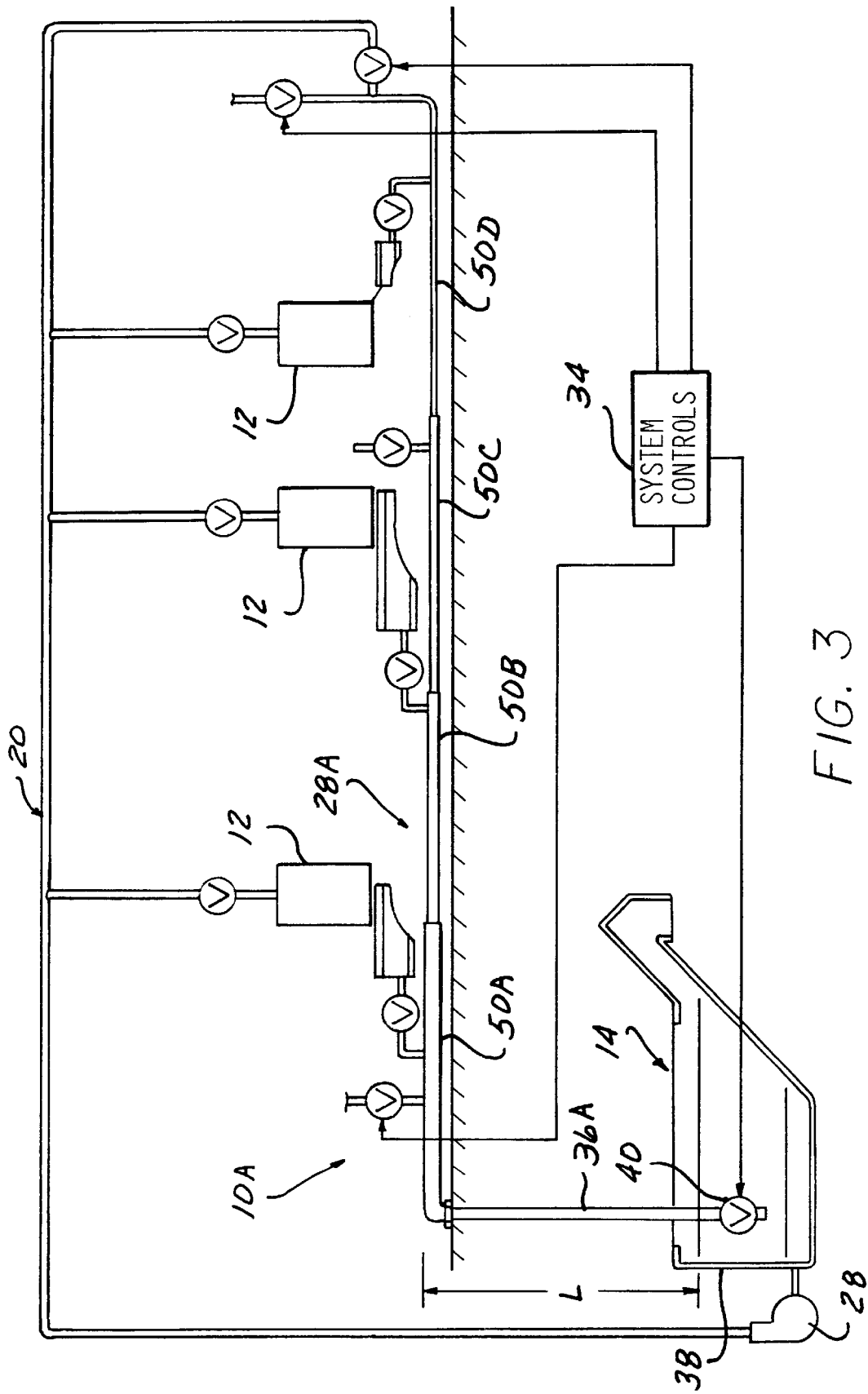
FIG. 3 is a diagram of a second embodiment of a fluid collection system according to the present invention.

FIG. 3 shows a second embodiment of the vacuum assist handling system 10A, which features a stepped diameter header pipe 28A which is located above floor level 16. Segments 50A, 50B, 50C are provided of decreasing diameter, segment 50B 20 inches in diameter, segment 50C 18 inches in diameter, and segment 50D 14 inches in diameter.

It has been calculated that a six foot down leg 36A would produce the following velocities as each segment of the 400 foot header pipe 28A empties:

An unobstructed, smoothly contoured header pipe is maintained in the absence of any flushing jets, and no additional pumps are required, to reduce the initial cost of the system as well as to lower maintenance costs and improve reliability over prior art systems.

Greater design flexibility in locating the header pipe results, i.e., it can be located above floor grade as shown in FIG. 3 to obviate the need for double containment since leaks can readily be detected.

The header pipe optionally could have a limited slope depending on the available vertical clearance below the sumps to aid in the flushing process and to insure complete drainage when the equipment is shut down as at night, although such slope in itself would not be sufficient to achieve the minimum flow velocity.

The advantage of drainage of the sumps over pump outs is that they may be completely emptied to avoid standing liquid when the equipment is shut down.

At shut down, the header pipe can be filled with clean liquid and drained to clean out the header pipe.

What is claimed is:

1. A system for collecting cutting fluid and chip from a series of machine tools comprising:
   a series of separate sumps disposed along the series of machine tools to collect fluid and chips therefrom;
   an elongated closed header pipe extending generally horizontally below each sump;
   a drain connection between each sump and said header pipe;
   said header pipe having a down leg at a downstream end descending vertically to direct cutting fluid to a filter apparatus including a receiving filter tank, and flush a control valve controlling opening of said down leg to allow filling of said down leg and header pipe with said cutting fluid and periodic discharge therefrom;
   one or more intermediate air vents located along said header pipe controllably opened to allow drainage of said cutting fluid into said header pipe, and to alternatively be closed to prevent the entrance of air; and
   a primary air vent located at an upstream end of said header pipe allowing air to be admitted into said header pipe to allow draining of said header pipe upon opening of said down leg flush control valve.

2. The system according to claim 1 wherein said header pipe is of a constant diameter.

3. The system according to claim 1 wherein said header pipe has a varying diameter, increasing towards said downstream end.

4. The system according to claim 1 wherein each sump drain has a control valve and a level sensor closing said control valve upon the liquid level declining to a predetermined minimum level to prevent air from entering said header pipe during drainage thereof.

5. The system according to claim 1 wherein said down leg descends vertically a distance on the order of six feet.

6. The system according to claim 1 wherein said header pipe is located above a floor grade on which said machine tools are disposed.

7. A process for handling cutting fluid and chips generated by a series of machine tools, comprising the steps of:
   collecting said cutting fluid and chips in a series of sumps for said machine tools;
   extending a header pipe below said sumps and connecting the sumps thereto to allow drainage of said sumps into said header pipe;

extending a down leg vertically down from a downstream end of said header pipe to direct fluid into a filter tank located below said header pipe;

closing said down leg to allow filling of said header pipe with cutting fluid and chips from said sump; and opening said down leg while venting the upstream end of said header to allow draining of said header pipe, said down leg of sufficient height to develop a vacuum level acting on said cutting fluid in said header pipe assisting sufficiently to establish a minimum flow velocity of said cutting fluid necessary to carry said chips along said header pipe with said cutting fluid.

8. The process according to claim 7 further including the step of decreasing the header pipe diameter in an upstream direction to increase the flow velocity therein to offset greater frictional losses upstream in said header pipe.

9. The process according to claim 7 further including the step of venting said header pipe at one or more intermediate points along said header pipe to allow drainage from said sumps into said header pipe, and closing said intermediate vents when said header pipe is being drained.

10. The process according to claim 7 further including the step of closing the rain connection between any sump and said header pipe whenever a sump level declines to a redetermined minimum level.

* * * * *